United States Patent Office 2,928,866
Patented Mar. 15, 1960

2,928,866
GEMINAL DINITRO DIAZA DINITRILES

Clinton R. Vanneman, Claremont, and Karl Klager, Monrovia, Calif., assignors to Aerojet-General Corporation, Azusa, Calif., a corporation of Ohio No Drawing. Application September 6, 1955
Serial No. 532,729

13 Claims. (Cl. 260—465.5)

This invention relates to new compositions of matter and a method for their preparation. In particular, it relates to geminal dinitro-diaza-dinitriles having the general formula:

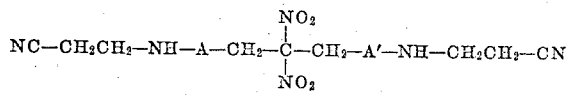

wherein A and A' are lower alkylene radicals.

These compounds are useful as chemical intermediates for the preparation of their corresponding diisocyanates. The nitriles of this invention react with nitric acid to form nitraza-dinitriles, as disclosed in our copending application No. 532,730, filed concurrently with the present application. The nitraza-dinitriles can be hydrolyzed in acid media to produce their corresponding nitraza acids, as disclosed in our copending application No. 532,731, filed concurrently with the present application. The diacids thus obtained can be converted to their corresponding diisocyanate derivatives by conversion to the diazide followed by pyrolysis according to the method disclosed in our copending application Serial No. 451,707, filed August 23, 1954, now abandoned.

The diisocyanates thus obtained react with polyalcohols such as ethylene glycol and 3,3-dinitro-1,5-pentanediol, in the presence of a catalyst such as boron trifluoride, to yield high molecular weight polyurethane compositions useful as solid propellants, according to the method disclosed in assignee's copending application Serial No. 422,649, filed April 12, 1954, now abandoned. The polyurethanes can be cast or pressed into a suitable shape, usually a cylinder, and placed in a conventional rocket chamber. To produce thrust for propulsion, the propellant is simply ignited whereby large quantities of gases are produced which impart forward thrust to the rocket upon exhaustion. The propellant can be ignited by any conventional igniter, as for example the igniter disclosed in assignee's copending application Serial No. 306,030, filed August 23, 1952.

The compounds of this invention are prepared by condensing acrylonitrile with a geminal dinitro amine, in accordance with the general reaction scheme set forth below:

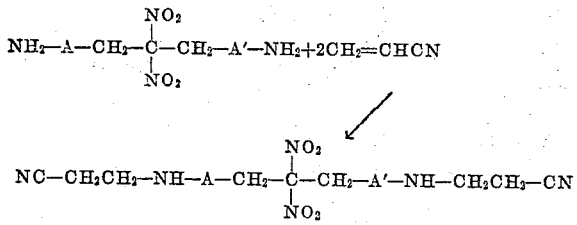

wherein A and A' are lower alkylene radicals.

The diamines used as starting materials for this invention are prepared by reacting a strong mineral acid with a geminal-dinitro-alkane-dicarbamate, as disclosed in assignee's copending application No. 428,790, filed May 10, 1954, now abandoned.

To more clearly illustrate this invention, the following examples are presented. It is to be understood, however, that these examples are presented merely as a means of illustration, and are not intended to limit the scope of the invention in any way.

EXAMPLE I

*Preparation of 7,7-dinitro-4,10-diaza-1,13-tridecane dinitrile*

To a solution of 82 gm. (0.5 mole) 3,3-dinitro-1,5-pentane diamine in 45 ml. methanol, 53 gm. (1 mole) acrylonitrile was added with stirring during a 10 minute period. The temperature rose from 27 to 40° C. during this addition and continued to rise to a maximum of 58° C. within 20 minutes. The solution was warmed briefly at gentle reflux temperature before the solvent was distilled under reduced pressure. The crude 7,7-dinitro-4,10-diaza-1,13-tridecane dinitrile was an oil and weighed 120 gm., corresponding to an 80.5% yield.

The particular temperatures and proportions employed in the above example are not critical in the practice of this invention. Other proportions as well as other temperatures can be used, however, lower temperatures require longer reaction times; higher temperatures permit shorter reaction times but tend to make the reaction more difficult to control.

The preparation of the new compositions of this invention may be conducted in the presence of an inert organic solvent.

A wide variety of dinitriles can be prepared by following the procedure set forth in Example I. For example, 8,8-dinitro-4,12-diaza-1,15-pentadecane dinitrile is prepared by condensing 4,4-dinitro-1,7-heptanediamine with acrylonitrile; 9,9-dinitro-4,14-diaza-1,17-heptadecane dinitrile is prepared by condensing 5,5-dinitro-1,9-nonane diamine with acrylonitrile; 8,8-dinitro-4,13-diaza-1,16-hexadecane dinitrile is prepared by reacting 4,4-dinitro-1,8-octanediamine with acrylonitrile; and 7,7-dinitro-4,11-diaza-1,14-tetradecane dinitrile is prepared by reacting 3,3-dinitro-1,6-diamine with acrylonitrile.

Any member of the entire disclosed class of compounds can be prepared simply by condensing an appropriate geminal dinitro diamine with acrylonitrile in accordance with the teachings of this invention.

This application is a continuation-in-part of our copending application No. 439,467, filed June 25, 1954.

We claim:

1. As new compositions of matter the dinitro-diaza-dinitriles having the general formula:

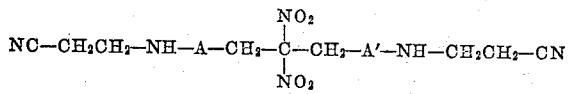

wherein A and A' are lower alkylene radicals.

2. As a new composition of matter, 7,7-dinitro-4,10-diaza-1,13-tridecane dinitrile having the structural formula:

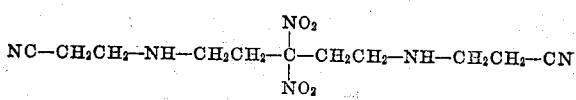

3. As a new composition of matter, 8,8-dinitro-4,12-diaza-1,15-pentadecane dinitrile having the structural formula:

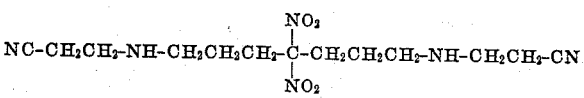

4. As a new composition of matter, 9,9-dinitro-4,14- diaza-1,17-heptadecane dinitrile having the structural formula:

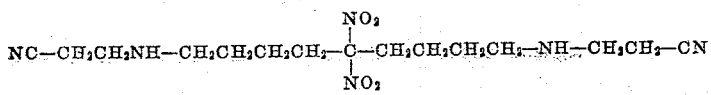

5. As a new composition of matter, 8,8-dinitro-4,13-diaza-1,16-hexadecane dinitrile having the structural formula:

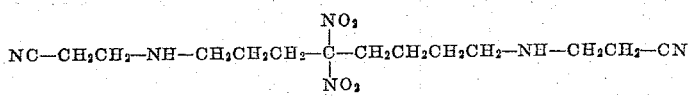

6. As a new composition of matter, 7,7-dinitro-4,11-diaza-1,14-tetradecane dinitrile having the structural formula:

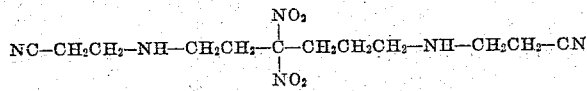

7. The method of preparing dinitro-diaza-dinitriles having the general formula:

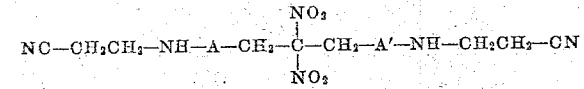

which comprises condensing acrylonitrile with a dinitro diamine alkane composition having the general formula:

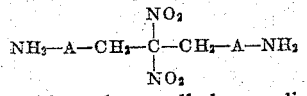

wherein A and A' are lower alkylene radicals.

8. The method of claim 7 wherein the condensation is conducted in the presence of an inert organic solvent.

9. The method of preparing 7,7-dinitro-4,10-diaza-1,13-tridecane dinitrile which comprises condensing acrylonitrile with 3,3-dinitro-1,5-pentane diamine.

10. The method of preparing 8,8-dinitro-4,12-diaza-1,15-pentadecane dinitrile which comprises condensing acrylonitrile with 4,4-dinitro-1,7-heptane diamine.

11. The method of preparing 9,9-dinitro-4,14-diaza-1,17-heptadecane dinitrile which comprises condensing acrylonitrile with 5,5-dinitro-1,9-nonane diamine.

12. The method of preparing 8,8-dinitro-4,13-diaza-1,16-hexadecane dinitrile which comprises condensing acrylonitrile with 4,4-dinitro-1,8-octane diamine.

13. The method of preparing 7,7-dinitro-4,11-diaza-1,14-tetradecane dinitrile which comprises condensing acrylonitrile with 3,3-dinitro-1,6-diamine.

No references cited.